US011064237B1

(12) United States Patent
Ram et al.

(10) Patent No.: US 11,064,237 B1
(45) Date of Patent: Jul. 13, 2021

(54) AUTOMATICALLY GENERATING CONTENT FOR DYNAMICALLY DETERMINED INSERTION POINTS

(71) Applicant: Amazon Technologies, Inc., Seattle, WA (US)

(72) Inventors: Varun Ram, Portland, OR (US); Ki Myung Han, Happy Valley, OR (US); Meera Jindal, Portland, OR (US); Viriya Ratanasangpunth, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/121,541

(22) Filed: Sep. 4, 2018

(51) Int. Cl.
*H04N 21/2668* (2011.01)
*H04N 21/845* (2011.01)
*H04N 21/81* (2011.01)
*H04N 21/258* (2011.01)
*H04N 21/236* (2011.01)
*H04N 21/239* (2011.01)

(52) U.S. Cl.
CPC ..... *H04N 21/2668* (2013.01); *H04N 21/2393* (2013.01); *H04N 21/23614* (2013.01); *H04N 21/25891* (2013.01); *H04N 21/8133* (2013.01); *H04N 21/8455* (2013.01); *H04N 21/8456* (2013.01)

(58) Field of Classification Search
CPC .......... H04N 21/2668; H04N 21/8455; H04N 21/8133; H04N 21/25891; H04N 21/23614; H04N 21/2393; H04N 21/8456
See application file for complete search history.

(56) References Cited

U.S. PATENT DOCUMENTS

| 6,438,596 | B1 | 8/2002 | Ueno et al. |
| 7,703,116 | B1 | 4/2010 | Moreau et al. |
| 8,095,466 | B2 | 1/2012 | Kahn et al. |
| 8,239,888 | B2 | 7/2012 | Todd |
| 8,248,931 | B2 | 8/2012 | Klein et al. |
| 8,621,540 | B2 | 12/2013 | Apsangi et al. |
| 8,799,977 | B1 | 8/2014 | Kapner et al. |
| 8,813,117 | B1 | 8/2014 | Inskip et al. |
| 9,679,315 | B2 | 6/2017 | Carasso |
| 9,923,771 | B2 | 3/2018 | Shah |
| 9,936,229 | B1 | 4/2018 | Wagenaar |
| 10,904,593 | B1 | 1/2021 | Jindal et al. |
| 2004/0213214 | A1 | 10/2004 | Jung et al. |
| 2006/0230176 | A1 | 10/2006 | Dacosta |
| 2007/0107036 | A1 | 5/2007 | Chen et al. |
| 2007/0157228 | A1 | 7/2007 | Bayer |
| 2007/0157281 | A1 | 7/2007 | Ellis et al. |
| 2007/0204310 | A1* | 8/2007 | Hua .................. H04N 7/17318 725/88 |
| 2008/0069131 | A1 | 3/2008 | Sakata et al. |

(Continued)

*Primary Examiner* — Yassin Alata
(74) *Attorney, Agent, or Firm* — Knobbe, Martens, Olson & Bear, LLP

(57) ABSTRACT

A video packaging and origination service can process requests for content segments from requesting user devices. The video packaging and origination service can processing video attributes, audio attributes and social media feeds to dynamically determine insertion points for supplemental content. Additionally, the video packaging and origination service can identify supplemental content utilizing the same attribute information.

19 Claims, 8 Drawing Sheets

(56) References Cited

U.S. PATENT DOCUMENTS

| | | |
|---|---|---|
| 2008/0081640 A1 | 4/2008 | Tran et al. |
| 2008/0141303 A1 | 6/2008 | Walker et al. |
| 2008/0189735 A1 | 8/2008 | Barton et al. |
| 2008/0235733 A1 | 9/2008 | Heie et al. |
| 2009/0025025 A1 | 1/2009 | Vleck et al. |
| 2009/0037965 A1 | 2/2009 | Tsai |
| 2009/0079871 A1 | 3/2009 | Hua et al. |
| 2009/0082095 A1 | 3/2009 | Walker |
| 2009/0171749 A1 | 7/2009 | Laruelle et al. |
| 2009/0172757 A1 | 7/2009 | Aldrey et al. |
| 2009/0328115 A1 | 12/2009 | Malik |
| 2009/0328119 A1 | 12/2009 | Kan et al. |
| 2010/0036962 A1 | 2/2010 | Gahm et al. |
| 2010/0058061 A1 | 3/2010 | Folta et al. |
| 2010/0287580 A1* | 11/2010 | Harding ............. H04N 21/8455 725/14 |
| 2011/0026470 A1 | 2/2011 | Joo et al. |
| 2011/0055866 A1 | 3/2011 | Piepenbrink et al. |
| 2011/0078717 A1 | 3/2011 | Drummond et al. |
| 2011/0110515 A1 | 5/2011 | Tidwell et al. |
| 2011/0112909 A1 | 5/2011 | Singh et al. |
| 2011/0191397 A1 | 8/2011 | Dazzi et al. |
| 2011/0191445 A1 | 8/2011 | Dazzi |
| 2011/0191446 A1 | 8/2011 | Dazzi et al. |
| 2011/0296473 A1 | 12/2011 | Babic |
| 2012/0023523 A1 | 1/2012 | Rajan et al. |
| 2012/0047535 A1 | 2/2012 | Bennett et al. |
| 2012/0066267 A1* | 3/2012 | Hays .................... G06F 40/103 707/803 |
| 2012/0124618 A1 | 5/2012 | Ruiz-Velasco et al. |
| 2012/0209961 A1 | 8/2012 | McCoy et al. |
| 2012/0242900 A1* | 9/2012 | Huang ................. G11B 27/031 348/563 |
| 2012/0284756 A1 | 11/2012 | Kotecha et al. |
| 2013/0104173 A1 | 4/2013 | Tijo et al. |
| 2013/0111509 A1 | 5/2013 | Guo |
| 2013/0198770 A1 | 8/2013 | Xiong et al. |
| 2013/0219449 A1 | 8/2013 | Muvavariwa et al. |
| 2013/0227618 A1 | 8/2013 | Jung et al. |
| 2014/0156363 A1 | 6/2014 | Hsu |
| 2014/0196079 A1 | 7/2014 | Jannard et al. |
| 2014/0317653 A1 | 10/2014 | Mlodzinski |
| 2015/0095461 A1 | 4/2015 | McGowan et al. |
| 2015/0208103 A1 | 7/2015 | Guntur |
| 2015/0229980 A1 | 8/2015 | Reisner |
| 2015/0356612 A1 | 12/2015 | Mays |
| 2016/0037232 A1 | 2/2016 | Hu |
| 2016/0156977 A1 | 6/2016 | Haverkamp Begemann |
| 2016/0173943 A1 | 6/2016 | Roberts |
| 2016/0182941 A1 | 6/2016 | Crabtree |
| 2016/0205443 A1* | 7/2016 | Ghadi .................. H04N 21/812 725/34 |
| 2016/0300537 A1 | 10/2016 | Hoffman et al. |
| 2016/0337691 A1 | 11/2016 | Prasad et al. |
| 2017/0272835 A1* | 9/2017 | Osanai ............... H04N 21/2407 |
| 2017/0337600 A1 | 11/2017 | Karanth et al. |
| 2017/0339114 A1 | 11/2017 | Watson et al. |
| 2018/0084291 A1* | 3/2018 | Wei ..................... H04N 21/812 |
| 2018/0160196 A1 | 6/2018 | Wahl |
| 2018/0192158 A1 | 7/2018 | Smith et al. |
| 2019/0034528 A1 | 1/2019 | Lintz |
| 2019/0174156 A1* | 6/2019 | Crawford ......... H04N 21/23424 |
| 2019/0273967 A1 | 9/2019 | Besehanic |
| 2020/0311992 A1 | 10/2020 | Sen et al. |

* cited by examiner

AUTOMATICALLY GENERATING CONTENT FOR DYNAMICALLY DETERMINED INSERTION POINTS

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of image quality and performance delivery of the requested content as reconstructed at the client computing device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
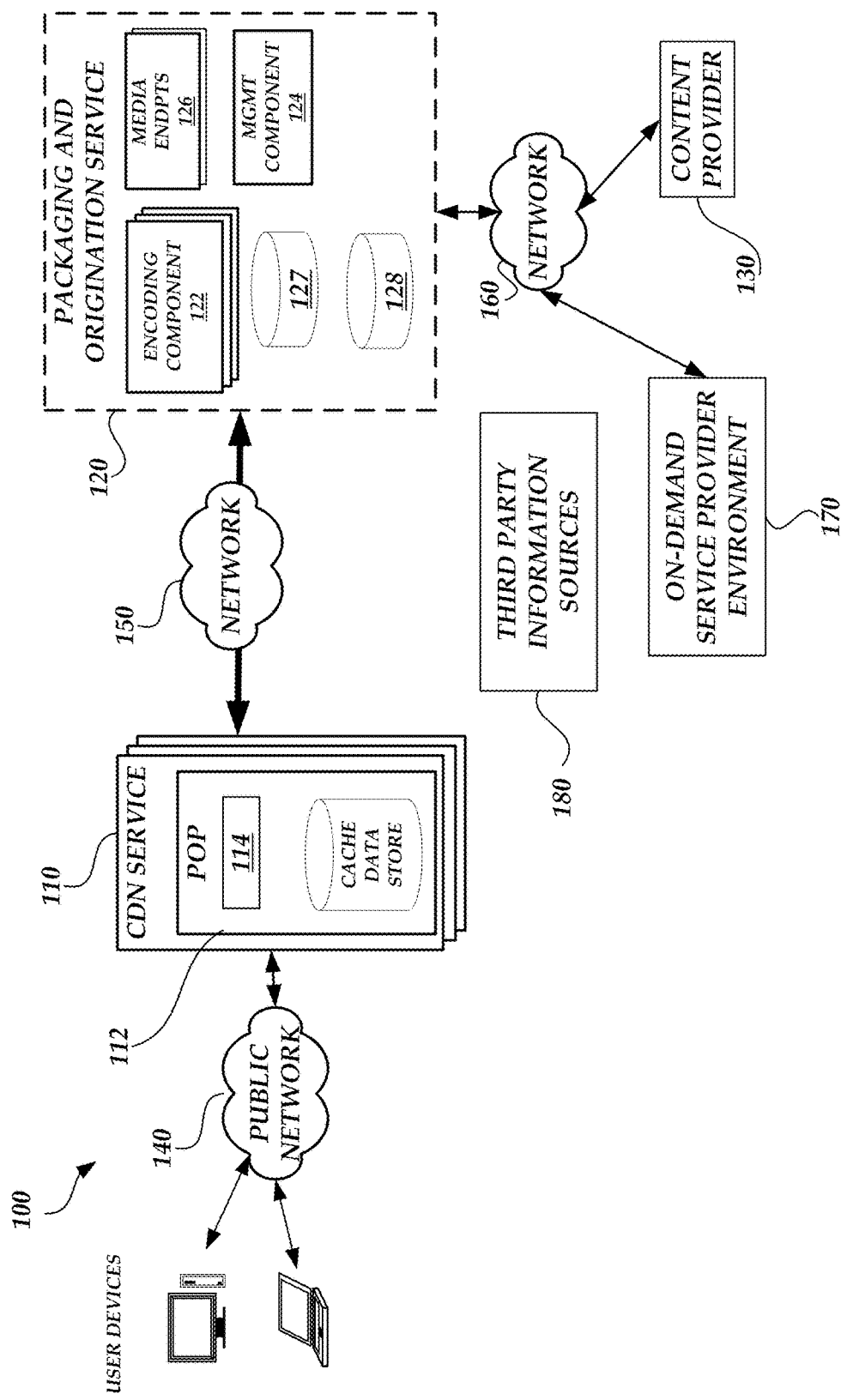
FIG. 1 is a block diagram of a content delivery environment that includes one or more client devices, one or more edge locations, a video packaging system, a content provider and an on-demand service provider in accordance with some embodiments.

Generally described, content providers can provide content to requesting users. With regard to video content, a content provider can implement a video packaging and origination service that is able to deliver video content to requesting users. Still further, the content provider or packaging and origination service can utilize a CDN or other content delivery component to deliver video content to requesting users or client computing devices utilizing streaming transmissions in accordance with one of a range of communication protocols, such as the hypertext transfer protocol ("HTTP").

Content providers can organize requested content, such as a video file, into multiple segments that are then transmitted to requesting devices segment by segment. For example, in a video stream, each segmented portion typically accounts for 2-10 seconds of video rendered on a receiving device. Each video segment can be encoded by a video packaging and origination service according to an encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

In some scenarios, a video packaging and origination service can distribute encoded content to different user devices or other recipients based on different financial models related to the quality of the encoded content or the inclusion/exclusion of additional encoded content. As applied to encoding content, a video packaging and origination service can set up a set of media endpoints to service user devices that request content. Respective media endpoints can package and provide encoded segments to requesting users. In some embodiments, the video packaging and origination service can include additional content, such as advertisements or associated content, that is delivered as part of a requested content stream.

With regard to the streaming of encoded content, a video packaging and origination service can associate supplemental content, such as advertisements, to the content streams. For example, a content provider associated with streaming content transmission may provide one or more opportunities for the insertion of the supplemental content. More specifically, in one embodiment, the content provider or other source can manually insert markers in the encoded content streams that are indicative of transition points for the insertion of supplemental content. In this regard, the manual insertion points are based exclusively on the markers provided by the content provider and are not well suited for dynamic determination of opportunities for insertion of supplemental content. For example, content providers may not be able to manually insert markers in live streaming or substantially live streaming fields.

To address at least in part some of the above-described deficiencies associated with traditional encoded content distribution techniques, aspects of the present application correspond to a method and system for managing encoded content segments. More specifically, a video packaging and origination service includes one or more encoders that are configured to encode content according to an encoding profile. Illustratively, the encoders encode the content into a plurality of segments. The encoded content segments can be then transmitted from the encoder to a data store or other storage location and made available to for one or more media endpoints, such as a packager.

In addition to receiving the content to be encoded, the video packaging and origination service can process one or more segments in the sequential series of encoded content segments to automatically determine insertion points for supplemental content, such as advertisements or complimentary content. In one aspect, the video packaging and origination service can detect scene changes between encoded content segments and identify the scene changes as insertion points for supplemental content. In another aspect, the video packaging and origination service can utilize changes between rendered content segments to determine transitions between segments of high activity or changes and segments with lower activity, e.g., a lull in an action sequence corresponding to set of encoded content segments. In still a further aspect, the video packaging and origination service can process associated soundtrack or close-captioning information included in the encoded content segments to identify insertion points based on volume levels or sound levels indicative of scene transitions or lulls (similar to described above). In still a further aspect, the video packaging and origination service can receive inputs from additional third party sources, such as social media feeds that can be indicative of events or sentiments that serve as natural insertion points for supplemental content (e.g., the scoring of a goal in a live streamed soccer match).

In accordance with another embodiment, the video packaging and origination service can utilize the dynamic determination of insertion points to further process the encoded content segments to select or form the supplemental content to be included in the content stream. For example, the video packaging and origination service can utilize image or object recognition services to identify one or more objects in the rendered encoded content segments and utilize the recognized objects as keywords or primary targets for the supplemental content. In another example, the video packaging and origination service can utilize textual analysis of third party content, such as social media feeds, to identify topics of interest at the determined insertion points. In yet another example, the video packaging and origination service can utilize audio feeds to identify keywords or other contextual information (e.g., language preference) in the audio track or close-captioned textual feed associated with the determined insertion points. In still a further example, the video packaging and origination service can utilize profile information, such as individual user or group preferences, to select between applicable supplemental content (e.g., a user profile specifying a preference for a brand of soda in situations in context of the streaming content indicate an opportunity to promote drinks). Accordingly, the video packaging and origination service can not only automatically determine appropriate moments in a content stream for inserting supplemental content, but can further provide keywords or context for the selection or formation of the supplement content.

Illustratively, aspects of the present application may utilize the execution of execution of portable segments of code, which can be generally referred to as "on-demand code" or "tasks." The server provider environment may include an on-demand code execution environment that functions to execute the on-demand code or tasks. Further details regarding such an on-demand code execution environment can be found within U.S. patent application Ser. No. 14/502,648, entitled PROGRAMMATIC EVENT DETECTION AND MESSAGE GENERATION FOR REQUESTS TO EXECUTE PROGRAM CODE, filed Sep. 30, 2014, and issued as U.S. Pat. No. 9,323,556 on Apr. 26, 2016 ("the '556 Patent), the entirety of which is hereby incorporated by reference.

In brief, to execute tasks, an on-demand code execution environment may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels.

Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager, as described in more detail in the '556 Patent, that is configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in the '556 Patent.

In accordance with one or more aspects of the present application, the video packaging and origination service can continue to leverage the benefit of execution of on-demand code and an on-demand code service provider. However, in other embodiments, the video packaging and origination service can utilize additional or alternative executable code that is described above with regard to functionality associated with the on-demand code. Additionally, based aspects of the present application, the video packaging and origination service will be described as facilitating various applications or examples for modifying the distribution of encoded content segments. Such examples are illustrative in nature and should be construed as limiting or exhaustive of all possible applications of one or more aspects of the present application.

FIG. 1 illustrates a general content delivery environment 100 for delivering content from original content providers to user devices. The content delivery environment 100 includes a plurality of devices 102 utilized by individual users, generally referred to as user computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service 120 can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP 112 is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 112 can include one or more processing components 114 for processing information for managing content provided by the video packaging and origination service 120. The POP 112 can further include a data store 116 for maintaining collected information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network or combination thereof. In the example environment of FIG. 1, network 140 is a global area network ("GAN"), such as the Internet. Protocols and components for communicating via the other aforementioned types of communication networks are well known to those skilled in the art of computer communications and thus, need not be described in more detail herein. While each of the client computing devices 102 and CDN service provider 110 are depicted as having a single connection to the network 140, individual components of the client computing devices 102 and CDN service provider 110 may be connected to the network 140 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 120 may utilize any number or combination of networks.

The content delivery environment 100 can include a plurality of content providers 130 for delivering input signals to the video packaging and origination service 120. The content providers may include one or more servers for delivering content, a data store for maintaining content and a communication manager for facilitating communications to the video packaging and origination service 120 over network 160. In other embodiments, the content provider 130 can further user devices 120 that are generating live video feeds for transmission by the video packaging and origination service 120. As will be described in detail below, illustratively, the content provider 130 can include or provide multiple, distinct input signals to the video packaging and origination service 120. Additionally, as described above, the content providers 130 can provide distribution information to the video packaging and origination service 120, such as via an API. The content delivery environment 100 can further include an on-demand service provider environment 170 for facilitating the execution of on-demand code or tasks, as will be described in greater detail below. Still further, the content delivery environment can access or receive additional inputs from third party data sources 180, such as social media services.

In accordance with embodiments, the video packaging and origination service 120 includes a set of encoding components 122 for receiving content provided by the content providers 130 (or other source) and processing the content to generate a set of encoded video segments available for delivery. The video packaging and origination service 120 is further optionally associated with a management component 124 to facilitate the determination of distribution of encoded content segments. The management component 124 can delegate at least some portion of the identified functionality to the encoder components themselves, such as the determination or negotiation of the handover or stop events.

The video packaging and origination service 120 can include a plurality of media endpoints 126. Illustratively, the media endpoints 126 can implement functionality associated with packaging and delivery of encoded content segments to user devices 120. Individual media endpoints 126 may be associated with defined geographic or logic areas serviced by the video packaging and origination service 120 and may implemented on different physical computing devices. As will be described in detail below, the video packaging and origination service 120 can vary the distribution of encoded content segments by dynamically modifying how individual encoded content segments are generated and transmitted to a set of media endpoints 126. For example, in some embodiments, the video packaging and origination service 120 can generate different forms for the encoded media streams based on the dynamically determined insertion points and dynamically selected supplemental content.

The video packaging and origination service 120 can further include multiple data stores of maintaining encoded content segments, distribution information or other information utilized in accordance with one or more aspects of the present application or otherwise utilized in the generation of encoded content. Illustratively, the video packaging and origination service 120 includes a data store 127 for receiving and maintaining encoded content segments from the one or more encoders 122. The video packaging and origination service 120 further includes a data store 128 for receiving and maintain distribution information, such as a database in which distribution information for encoded content segments is represented in one or more individual database records. The data store 128 can be further utilized for maintaining information regarding server-side collection statistics, including state data or other information previously measured.

It will be appreciated by those skilled in the art that the video packaging and origination service 120 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one more virtual machines implemented in a hosted computing environment. A hosted computing environment may include one or more rapidly provisioned and released computing resources, which computing resources may include computing, networking or storage devices. Additionally, the data stores 127 and 128 may be implemented in a distributed manner that encompasses multiple computing devices geographically or logically distinct. Still further, in some embodiments, the video packaging and origination service 120 may omit a portion, or all, of the functionality associated with interaction service provider environment 170 such as by maintaining executable code or components configured to implement at least a portion of such functionality.

Figure 2:
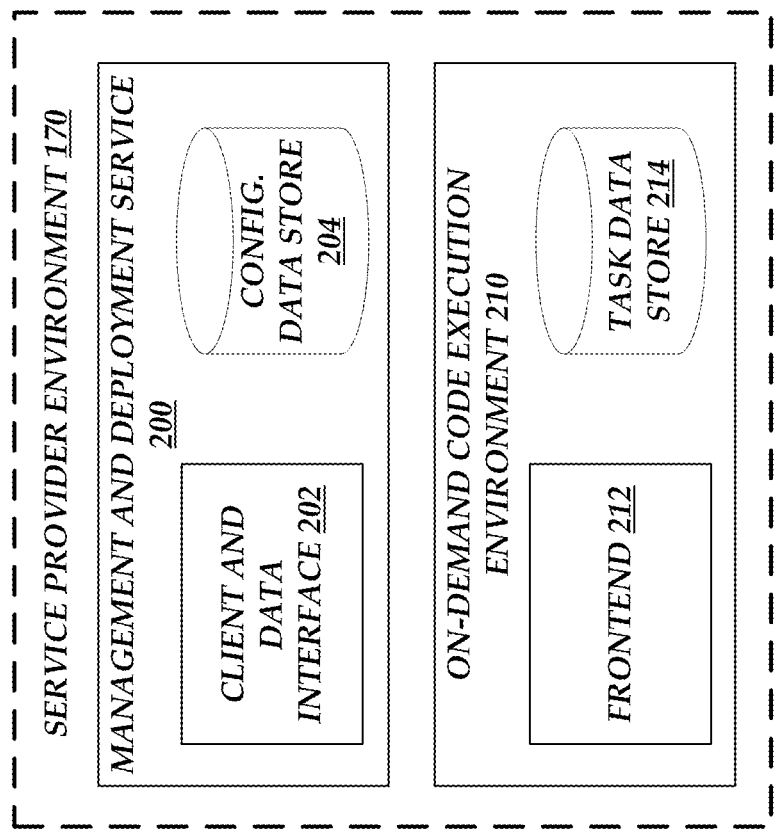
FIG. 2 is a block diagram of illustrative of components of a service provider environment for executing on-demand code in accordance with some embodiments.

Turning now to FIG. 2, an illustrative service provider environment 170 for the execution of on-demand code or tasks will be described. By way of illustrative example, the video packaging and origination service 120 may utilize on-demand code to generate different forms of content streams based on determined insertion points for supplemental content. The service provider environment 170 can include a number of elements to enable configuration of, management of, and communications with the video packaging and origination service 120. Specifically, the service provider environment 170 includes a management and deployment service 200 to enable interaction with the video packaging and origination service 120, and an on-demand code execution environment 210 providing on-demand, dynamic execution of tasks.

As shown in FIG. 2, the management and deployment service 200 includes a client and data interface 202 and a configuration data store 204 that may operate collectively to enable registration of the video packaging and origination service 120. Illustratively, the client and data interface 202 may provide one or more user interfaces (e.g., APIs, CLIs, GUIs, etc.) through which the video packaging and origination service 120, may generate or submit a configuration of on-demand executable code as described herein. The configuration data store 204 can correspond to any persistent or substantially persistent data store, such as a hard drive (HDD), a solid state drive (SDD), network attached storage (NAS), a tape drive, or any combination thereof.

In some embodiments, the on-demand code execution environment 170 may include multiple edge locations from which a user device can retrieve content. Individual edge locations may be implemented in one or more POPs. As described with regard to the CDN service provider, POPs are generally associated with a specific geographic location in which the computing devices implementing the POP are located, or with a region serviced by the POP. Illustratively, individual POPs can include one or more information processing components for providing on-demand execution of tasks (e.g., portable code segments). In some instances, the POPs may implement one or more services, such as CDN services, data storage services, data processing services, etc. The CDN service provider 110 may include multiple POPs located in different geographic locations so that components of the video packaging and origination service 120 can communicate with a logically proximate POP to transmit requests for authentication and authorization and receive processing results.

The on-demand code execution environment 210 can include a number of devices providing on-demand execution of tasks (e.g., portable code segments). Specifically, the on-demand code execution environment 210 can include a frontend 212, through which computing devices, may submit tasks to the on-demand code execution environment 210 and call for execution of tasks on the on-demand code execution environment 210. Such tasks may be stored, for example, in a task data store 214, which can correspond to any persistent or substantially persistent data store, such as a hard drive (HDD), a solid state drive (SDD), network attached storage (NAS), a tape drive, or any combination thereof. While not shown in FIG. 2, the on-demand code execution system 210 can include a variety of additional components to enable execution of tasks, such as a number of execution environments (e.g., containers or virtual machines executing on physical host devices of the on-demand code execution environment 210), a worker manager to manage such execution environments, and a warming pool manager to assist in making execution environments available to the worker manager on a rapid basis (e.g., under 10 ms). Further details regarding the on-demand code execution environment can be found within the '556 Patent, incorporated by reference above.

As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 210 in a variety of manners. In one embodiment, a computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 114, a network-accessible storage service, or the task data store 214) prior to the request being received by the on-demand code execution system 150. A request interface of the on-demand code execution system 210 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface of the frontend 212.

A call to execute a task may specify one or more third-party libraries (including native libraries) to be used along with the user code corresponding to the task. In one embodiment, the call may provide to the on-demand code execution system 210 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 210 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 210 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 210 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 210 may inspect the call and look for the flag or the header, and if it is present, the on-demand code execution system 210 may modify the behavior (e.g., logging facilities) of the execution environment in which the task is executed, and cause the output data to be provided back to the user. In some embodiments, the behavior/mode indicators are added to the call by the user interface provided to the user by the on-demand code execution system 210. Other features such as source code profiling, remote debugging, etc., may also be enabled or disabled based on the indication provided in a call.

Figure 3:
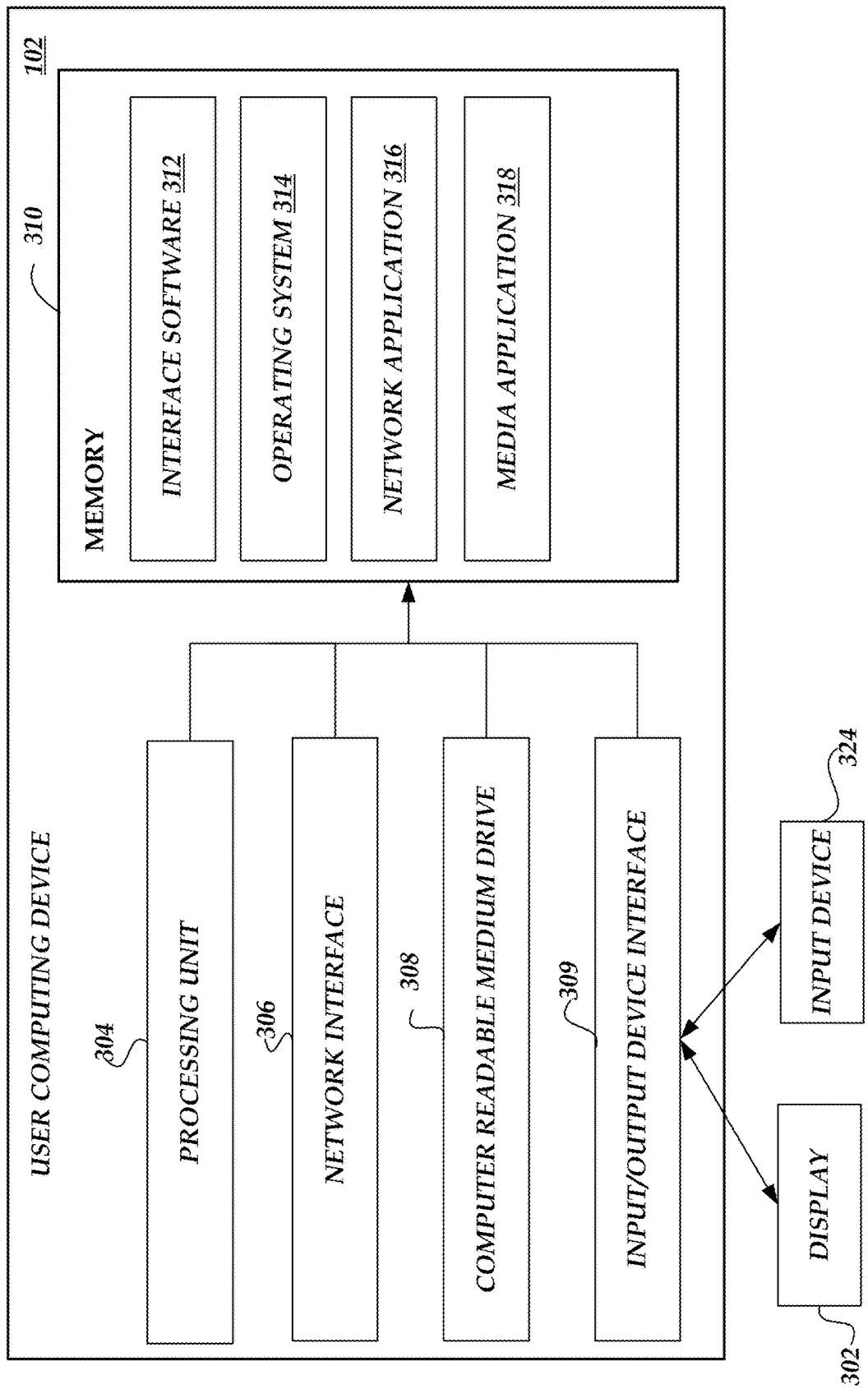
FIG. 3 is a block diagram illustrative of components of user device for requesting and receiving encoded content in accordance with some embodiments.

FIG. 3 depicts one embodiment of an architecture of an illustrative user computing device 102 that can generate content requests and process metric information in accordance with the present application. The general architecture of the user computing device 102 depicted in FIG. 3 includes an arrangement of computer hardware and software components that may be used to implement aspects of the present disclosure. As illustrated, the user computing device 102 includes a processing unit 304, a network interface 306, an input/output device interface 309, an optional display 302, and an input device 324, all of which may communicate with one another by way of a communication bus.

The network interface 306 may provide connectivity to one or more networks or computing systems, such as the network 140 of FIG. 1 and the video packaging and origination service 120 or the content provider 130. The processing unit 304 may thus receive information and instructions from other computing systems or services via a network. The processing unit 304 may also communicate to and from memory 310 and further provide output information for an optional display 302 via the input/output device interface 309. The input/output device interface 309 may also accept input from the optional input device 324, such as a keyboard, mouse, digital pen, etc. In some embodiments, the user computing device 102 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the user computing device 102. The memory 310 may further include computer program instructions and other information for implementing aspects of the present disclosure. For example, in one embodiment, the memory 310 includes interface software 312 for requesting and receiving content from the video packaging and origination service 120 via the CDN service provider 110. In another example, in one embodiment, the memory 310 includes a specific media player application for accessing content, decoding the encoded content, and communicating with the CDN service provider 110.

Figure 4:
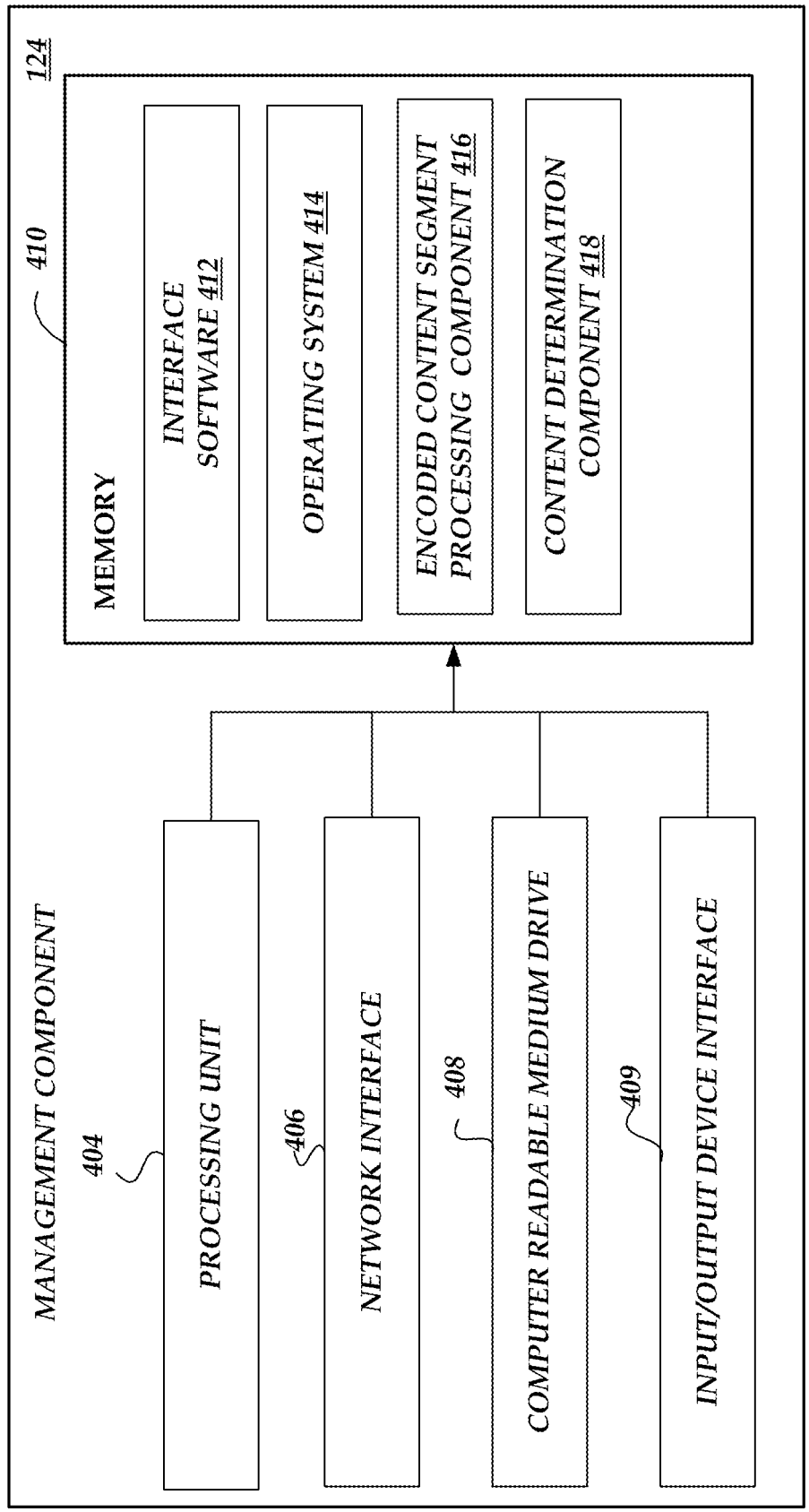
FIG. 4 is a block diagram illustrative of components of a management component of a video packing and origination service for managing the distribution of encoded content segments in accordance with some embodiments.

FIG. 4 depicts one embodiment of an architecture of an illustrative computing device for implementing various aspects of the distribution of encoded content streams or the characterization of aspects of the user device 102 as described herein. The computing device 400 can be a part of the video packaging and origination service 120, such as a management component 124. Alternatively, the computing device may a stand-alone device independent of the video packaging and origination service 120 or as part of a service/service provider also independent of the video packaging and origination service 120.

The general architecture of the computing device 400 depicted in FIG. 4 includes an arrangement of computer hardware and software components that may be used to implement aspects of the present disclosure. As illustrated, the computing device 400 includes a processing unit 404, a network interface 406, a computer readable medium drive 408, an input/output device interface 409, all of which may communicate with one another by way of a communication bus. The components of the computing device 400 may be physical hardware components or implemented in a virtualized environment.

The network interface 406 may provide connectivity to one or more networks or computing systems, such as the network 150 or network 160 of FIG. 1. The processing unit 404 may thus receive information and instructions from other computing systems or services via a network. The processing unit 404 may also communicate to and from memory 410 and further provide output information for an optional display via the input/output device interface 409. In some embodiments, the computing device 400 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the computing device 400. The memory 410 may further include computer program instructions and other information for implementing aspects of the present disclosure. For example, in one embodiment, the memory 410 includes interface software 412 for receiving and processing content streams. Memory 410 includes an encoded content processing component 416 for determining or characterizing insertion points for content streams as described herein. The memory 410 can further include an encoded content generation routine for dynamically generating supplemental content to be inserted in one or more determined insertion points.

As specified above, in one embodiment, the computing device 400 illustrated in FIG. 4 can be implemented as physical computing devices or virtualized computing devices in a computing network. In another embodiment, the computing device 400 may be implemented as logical components in a virtual computing network in which the functionality of the computing device 400 is implemented by an underlying substrate network of physical computing devices. In this embodiment, the computing device 400 may not be actually instantiated in the physical computing devices of the substrate network. Accordingly, reference to instantiation of a computing device 400 to carry out a desired function can correspond to a configuration of physical computing devices functioning as the computing device 400, instantiation of virtualized computing devices functioning as the computing device or instantiation of logical components in a virtualized network. In each of these examples, the creation, configuration and implementation of the components and the interactions described herein would vary according to the specific instantiation of the computing device 400. Thus, aspects of the present application should not be limited to interpretation requiring a physical, virtual or logical embodiment unless specifically indicated as such.

Figure 5:
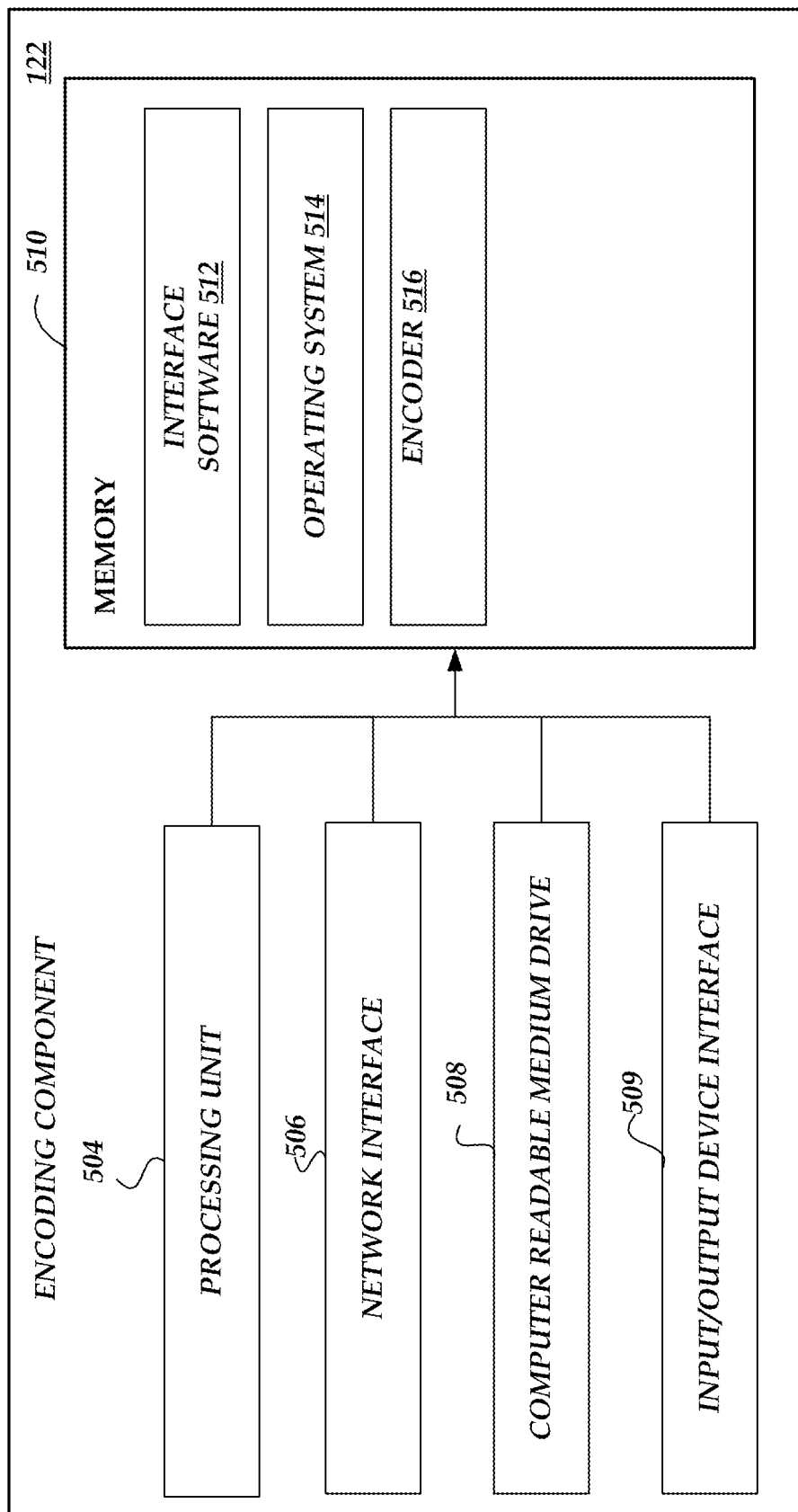
FIG. 5 is a block diagram of illustrative of components of an encoder of a packaging and origination service configured to manage content encoding in accordance with some embodiments.

FIG. 5 depicts one embodiment of an architecture of an illustrative encoding component 122 for implementing the video packaging and origination service 120 described herein. The general architecture of the encoding component 122 depicted in FIG. 5 includes an arrangement of computer hardware and software components that may be used to implement aspects of the present disclosure. As illustrated, the encoding component 122 of the video packaging and origination service 120 includes a processing unit 504, a network interface 506, a computer readable medium drive 508, an input/output device interface 509, all of which may communicate with one another by way of a communication bus. The components of the encoding component 122 may be physical hardware components or implemented in a virtualized environment.

The network interface 506 may provide connectivity to one or more networks or computing systems, such as the network 150 or network 160 of FIG. 1. The processing unit 504 may thus receive information and instructions from other computing systems or services via a network. The processing unit 504 may also communicate to and from memory 510 and further provide output information for an optional display via the input/output device interface 509. In some embodiments, the encoding component 122 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the video packaging and origination service 120. The memory 510 may further include computer program instructions and other information for implementing aspects of the present disclosure. For example, in one embodiment, the memory 510 includes interface software 512 for receiving and processing content requests from user devices 102. Memory 510 includes an encoder 516 for encoding video segments to be sent to user devices 102 in response to content requests.

As specified above, in one embodiment, the encoder components 122 illustrated in FIG. 5 can be implemented as physical computing devices or virtualized computing devices in a computing network. In another embodiment, the encoded components 122 may be implemented as logical components in a virtual computing network in which the functionality of the encoder components are implemented by an underlying substrate network of physical computing devices. In this embodiment, the logical encoder components may not be actually instantiated in the physical computing devices of the substrate network. Accordingly, reference to instantiation of the encoder components can correspond to a configuration of physical computing devices functioning as encoder components, instantiation of virtualized computing devices functioning as encoder components or instantiation of logical components in a virtualized network. In each of these examples, the creation, configuration and implementation of the components and the interactions described herein would vary according to the specific instantiation of the encoder component. Thus, aspects of the present application should not be limited to interpretation requiring a physical, virtual or logical embodiment unless specifically indicated as such.

Figure 6A:
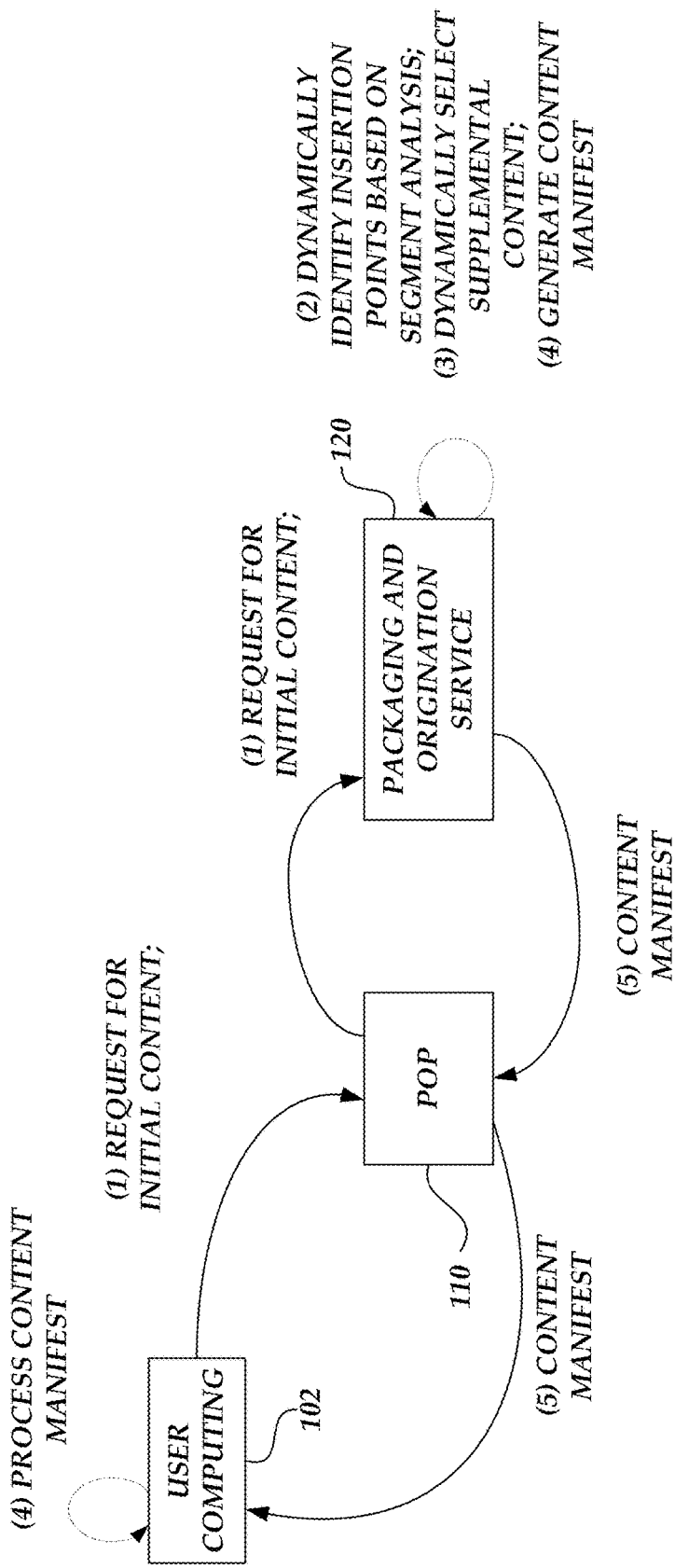
FIGS. 6A-6B are block diagrams of the content delivery environment of FIG. 1 illustrating the characterization of insertion points for supplemental content and the selection of supplemental content based on receipt and processing of requests for encoded content segments.
Figure 6B:
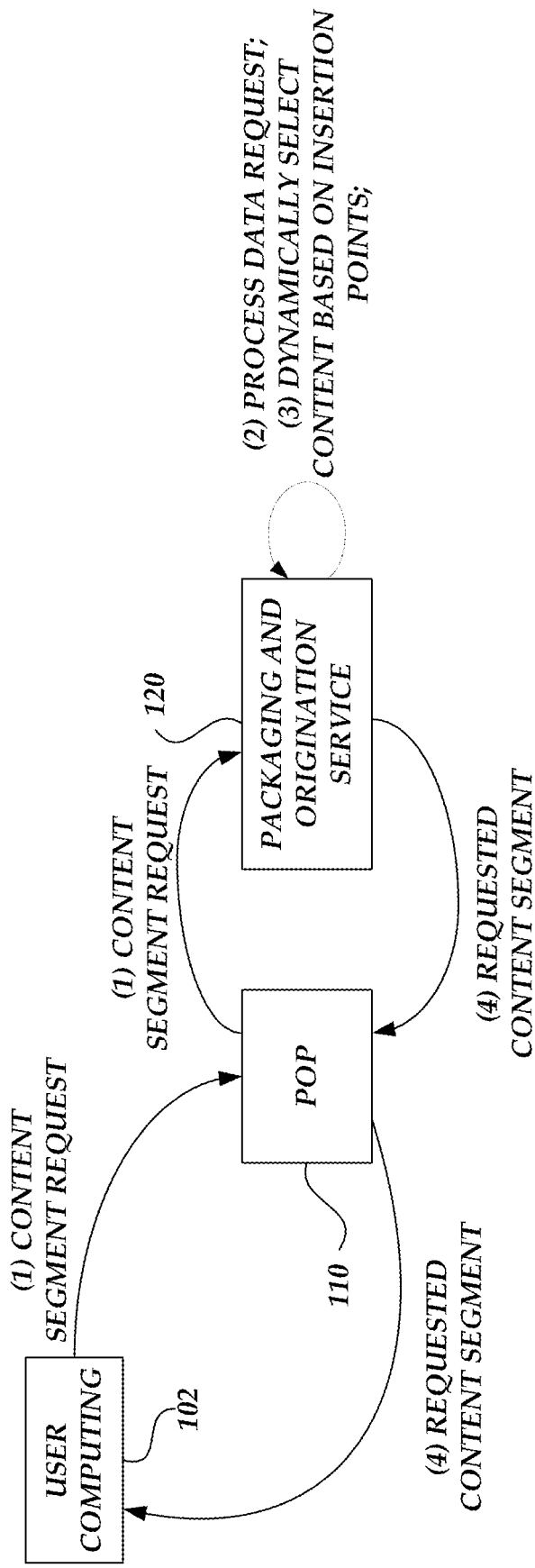

Turning now to FIGS. 6A and 6B, an illustrative interaction for the processing of content requests will be described. For purposes of illustration, content requests by the user device 102 will be described with regard to the transmission of segmented encoded contents, such as in accordance with DASH. Such interaction is illustrative and other forms of content transmission may be utilized. At (1), the user device 102 transmits a request for content. Illustratively, a user can access one or more software applications on the user device 102 to request content, such as streaming content. For example, the user device 102 can generate an interface for receiving user commands or interactions and transmit the request, such as via the media application 318. The initial content request may be transmitted directly to the video packaging and origination service 120. Alternatively, the initial content request may be routed, such as via DNS routing or HTTP-based routing, to a POP 110. In some embodiments, the request for content can include user preferences, search terms, keywords or access to profile information for utilization in processing the request for content, determination of insertion points for supplemental content, or selection of the supplemental content.

In response, at (2), the video packaging and origination service 120 processes the encoded content segments provided by the content provider 130 to dynamically determine insertion points for the content stream. Illustratively, the video packaging and origination service 120 can utilize one or more techniques for the determination of dynamic insertion points. More specifically, the video packaging and origination service can process one or more segments in the sequential series of encoded content segments to automatically determine insertion points for supplemental content, such as advertisements or complimentary content. In one aspect, the video packaging and origination service 120 can detect scene changes between encoded content segments and identify the scene changes as insertion points for supplemental content. For example, the video packaging and origination service 120 can utilize color analysis or screen color comparison information to determine that a threshold portion of the rendered image has gone dark or has changed sufficiently to characterize one or more segments as associated with a scene change.

In another aspect, the video packaging and origination service 120 can utilize changes between rendered content segments to determine transitions between segments of high activity or changes and segments with lower activity. For example, the video packaging and origination service 120 can process a sequence of rendered content segments in which objects are subject to threshold levels of movement. If the video packaging and origination service 120 detects one or more segments in which the level of movement passes below a threshold level of movement, such as a lull in an action sequence corresponding to set of encoded content segments, a time out or injury in a live streamed sporting event, and the like.

In still a further aspect, the video packaging and origination service 120 can process associated soundtrack or close-captioning information included in the encoded content segments to identify insertion points based on volume levels or sound levels indicative of scene transitions or lulls (similar to described above). In still a further aspect, the video packaging and origination service 120 can receive inputs from additional third party sources, such as social media feeds that can be indicative of events or sentiments that serve as natural insertion points for supplemental content. For example, the video packaging and origination service 120 can monitor social media feeds for keywords indicative of insertion events, such as the scoring of a goal in a live streamed soccer match or general expression of sentiments, such as exclamations. Such keyword searching may be preconfigured by the video packaging and origination service 120 or can be naturally inferred based on frequency or reoccurrence of keywords.

Illustratively, the video packaging and origination service 120 can dynamically determine a set of insertion points and a frequency of occurrence based, at least in part, on the examples described above or other techniques. In some embodiments, the video packaging and origination service 120 can filter the set of insertion points to select a subset of insertion points that will be utilized to insert supplemental content. For example, the video packaging and origination service 120 can utilize thresholds or time windows that establish a minimum amount of time that has to be between markers (manual or dynamic) and then select from insertion points meeting the time criteria. In still other embodiments, the video packaging and origination service 120 can be configured with priority criteria or sorting criteria that facilitates the selection dynamically determined insertion points. For example, the video packaging and origination service can be configured to prioritize insertion points based on determined scene changes compared to insertion points based on lulls in action (as described above). In another example, the video packaging and origination service 120 can be configured to prioritize insertion points that can be matched more closely with the subject matter of the supplement content (e.g., prioritizing an insertion point corresponding to a scoring scenario based on a match with supplemental content promoting a sporting goods store). Still further, the number of insertion points and frequency of occurrence can be based on characteristics of the content stream, such as premium content (e.g., commercial free) vs. free content (e.g., maximum frequency of supplemental content).

In some embodiments, the original content provider 130 may provide encoded content with markers that correspond to manually determined insertion points for supplemental content, such as advertisements (e.g., CUE IN and CUE OUT markers). In such embodiments, the video packaging and origination service 120 can bypass or ignore the manually inserted markers in favor of any dynamically determined insertion points. In other embodiments, the video packaging and origination service 120 can supplement at least a portion of the manually determined markers with one or more the dynamically determined insertion. For example, the video packaging and origination service 120 can utilize thresholds or time windows that establish a minimum amount of time that has to be between markers (manual or dynamic) and then select from markers meeting the time criteria. In still other embodiments, the video packaging and origination service 120 can be configured with priority criteria or sorting criteria that facilitates the selection between manually configured markers and dynamically determined insertion points.

At (3), the video packaging and origination service 130 can utilize the dynamic determination of insertion points to further process the encoded content segments to select or form the supplemental content to be included in the content stream. For example, the video packaging and origination service can utilize image or object recognition services to identify one or more objects in the rendered encoded content segments and utilize the recognized objects as keywords or primary targets for the supplemental content. In this embodiment, the video packaging and origination service 120 can have templates or learning algorithms that can process rendered screen displays and generate context information of objects that have been associated with the rendered display. For example, the video packaging and origination service 120 can utilize machine learning algorithms that are trained specifically to identify object associated with entities that have contractually signed up for supplemental content (e.g., a coffee cup). Accordingly, while the rendered content can include a number of objects capable of being detected, the video packaging and origination service 120 can be configured specifically to identify a smaller subject of the detectable objects.

In another example, the video packaging and origination service 120 can utilize textual analysis of third party content, such as social media feeds, to identify topics of interest at the determined insertion points. As described above, keyword searching may be preconfigured by the video packaging and origination service 120 or can be naturally inferred based on frequency or reoccurrence of keywords. In yet another example, the video packaging and origination service 120 can utilize audio feeds or close captioning information to identify keywords or other contextual information in the audio track associated with the determined insertion points. The audio feeds/close captioning information can be further utilized to select language preferences as context information for the selection of the supplemental content. In still a further example, the video packaging and origination service can utilize profile information, such as user or group preferences, to select between applicable supplemental content (e.g., a user profile specifying a preference for a brand of soda in situations in context of the streaming content indicate an opportunity to promote drinks). The group preferences can be associated with user specified groups (e.g., a family group profile) or organization criteria accessible by the video packaging and origination service 120, such as network service provider, regional identifiers, and the like.

In addition to the utilization of the content segments or social media inputs, the video packaging and origination service 120 can utilize information associated with individuals or groups of individuals to select, or select from, supplemental content. For example, if the video packaging and origination service 120 determines that a screen includes an image of a glass, the video packaging and origination service 120 can utilize preferences for brands of drinks to dynamically select supplemental content advertising preferred drinks. Such preferences may be based on individual user preferences or group preferences (e.g., users in the Northeast). In another example, the video packaging and origination service 120 can utilize profile information to determine not to select particular content, such as content identified as offensive, content previously presented or preference information indicating a preference to avoid particular content.

In some embodiments, the video packaging and origination service 120 can utilize a service to provide the content based on keywords obtained utilized the techniques identified above. Additionally, the video packaging and origination service 120 can invoke on-demand code or tasks that enables the video packaging and origination service 120 to insert selected supplemental content into the manifest, such as at a media endpoint.

At (4), the video packaging and origination service 120 generates a content manifest that identifies a listing of available encoding bitrates or bitrate/format combinations for a first segment of the requested content. Illustratively, the listing of available encoding bitrates or bitrate/format combinations includes sufficient information that allows the user computing device 102 to process the information and request individual encoded content segments from the content stream. The encoded content segments can be identified sequentially in a manner that determines, at least in part, an order of request and rendering on the user device 102. Additionally, in some embodiments, the manifest can identify multiple portions, such as a first portion corresponding to the requested content (e.g., a movie or live event) and a second portion corresponding to additional or supplemental content. Illustratively, the additional or supplemental content can be advertisements or additional content that is to be rendered along with the requested content. In embodiments in which the content streams include multiple portions, as identified above, each portion may be sequenced differently. Alternatively, in some embodiments, the requested content segments may share common sequencing data. The content manifests can further include additional meta-data, such as hyperlinks, display configurations, or other information utilized by the user device 102. At (5), the video packaging and origination service 120 transmits the content manifest to the user device 102.

Turning now to FIG. 6B, at (1), the user device 102, through the media application, transmits requests for one or more segments of video at a selected encoding bitrate, or bitrate/format combination. The video packaging and origination service 120 receives the request and transmits the requested segment to the user computing device. For purposes of the present application, the process of selecting and requesting segments according to an encoding bitrate or bitrate/format combinations by the user computing device 102 and transmitting the requested bitrate can be repeated a number of times. Such a repetitive process would be indicative of a sequential transmission of segments for streaming content.

Based on the requests for encoded content segments, the video packaging and origination service 120 generates or calculates user processing information characterizing one or more attributes related to the receipt of encoded content streams by receiving user devices. More specifically, at (2), the video packaging and origination service 120 processes the request for content segments. Illustratively, the video packaging and origination service 120 can access the segments that have been previously stored for transmission to the requesting user device 102. At (3), in some embodiments, if the video packaging and origination service 120 has not previously determined supplemental content to be included in insertion points, as described above with regard to FIG. 6A, the video packaging and origination service 120 can select the dynamic content described above. At (4), the video packaging and origination service 120 transmits the requested content segments to the user device 102.

Illustratively, the video packaging and origination service 120 can utilize dynamic insertion points and dynamic supplemental content selection to facilitate the generation of content streams. For example, the video packaging and origination service 120 can better leverage opportunities to determine appropriate insertion points without requiring reliance on the content provider to manually instrument the insertion points or by ignoring manually created insertion points. Still further, the video packaging and origination service 120 can select supplemental content that coincides with the dynamically determined insertion points to make the inclusion of supplemental content better suited to the content stream.

Figure 7:
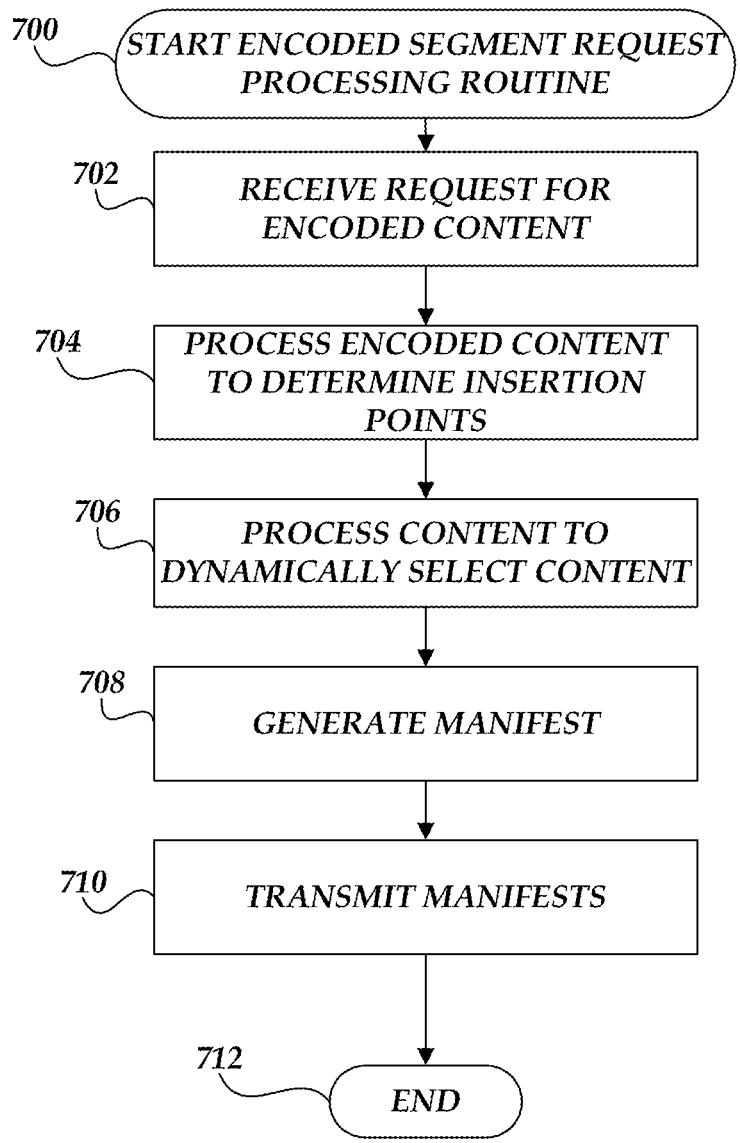
FIG. 7 is a flow diagram illustrative of a dynamic content insertion and selection routine implemented by a video packaging and origination system in accordance with some embodiments.

Turning now to FIG. 7, a flow diagram 700 illustrative of a dynamic content insertion and selection processing routine 700 implemented by the video packaging and origination service 120 will be described. Illustratively, routine 700 can be implemented upon receipt of one or more request for content segments from the user device 102. At block 702, the video packaging and origination service 120 receives an initial the request for a content segment or multiple content segments. Illustratively, as described above, the user device 102 transmits a request for content. Illustratively, a user can access one or more software applications on the user device 102 to request content, such as streaming content. For example, the user device 102 can generate an interface for receiving user commands or interactions and transmit the request, such as via the media application 318. The initial content request may be transmitted directly to the video packaging and origination service 120. Alternatively, the initial content request may be routed, such as via DNS routing or HTTP-based routing, to a POP 110.

At block 704, the video packaging and origination service 120 processes the encoded content segments provided by the content provider 130 to determine dynamic insertion points for the content stream. Illustratively, the video packaging and origination service 120 can utilize one or more techniques for the determination of dynamic insertion points. More specifically, the video packaging and origination service can process one or more segments in the sequential series of encoded content segments to automatically determine insertion points for supplemental content, such as advertisements or complimentary content. In one aspect, the video packaging and origination service 120 can detect scene changes between encoded content segments and identify the scene changes as insertion points for supplemental content. For example, the video packaging and origination service 120 can utilize color analysis or screen color comparison information to determine that a threshold portion of the rendered image has gone dark or has changed sufficiently to characterize one or more segments as associated with a scene change.

In another aspect, the video packaging and origination service 120 can utilize changes between rendered content segments to determine transitions between segments of high activity or changes and segments with lower activity. For example, the video packaging and origination service 120 can process a sequence of rendered content segments in which objects are subject to threshold levels of movement. If the video packaging and origination service 120 detects one or more segments in which the level of movement passes below a threshold level of movement, such as a lull in an action sequence corresponding to set of encoded content segments, a time out or injury in a live streamed sporting event, and the like.

In still a further aspect, the video packaging and origination service 120 can process associated soundtrack information included in the encoded content segments to identify insertion points based on volume levels or sound levels indicative of scene transitions or lulls (similar to described above). In still a further aspect, the video packaging and origination service 120 can receive inputs from additional third party sources, such as social media feeds that can be indicative of events or sentiments that serve as natural insertion points for supplemental content. For example, the video packaging and origination service 120 can monitor social media feeds for keywords indicative of insertion events, such as the scoring of a goal in a live streamed soccer match or general expression of sentiments, such as exclamations. Such keyword searching may be preconfigured by the video packaging and origination service 120 or can be naturally inferred based on frequency or reoccurrence of keywords.

As described above, the video packaging and origination service 120 can dynamically determine a set of insertion points and the frequency in which the insertion points occur based, at least in part, on the examples described above or other techniques. In some embodiments, the video packaging and origination service 120 can filter the set of insertion points to select a subset of insertion points that will be utilized to insert supplemental content. For example, the video packaging and origination service 120 can utilize thresholds or time windows that establish a minimum amount of time that has to be between markers (manual or dynamic) and then select from insertion points meeting the time criteria. The time windows can be modified such that the frequency of occurrence of the insertion points can be dynamically modified, such as by content type, user request, content provider criteria, and the like. In still other embodiments, the video packaging and origination service 120 can be configured with priority criteria or sorting criteria that facilitates the selection dynamically determined insertion points. For example, the video packaging and origination service can be configured to prioritize insertion points based on determined scene changes compared to insertion points based on lulls in action (as described above). In another example, the video packaging and origination service 120 can be configured to prioritize insertion points that can be matched more closely with the subject matter of the supplement content (e.g., prioritizing an insertion point corresponding to an identified object, such as a coffee cup, based on a match with supplemental content promoting beverages).

In some embodiments, the original content provider 130 may provide encoded content with markers that correspond to manually determined insertion points for supplemental content, such as advertisements (e.g., CUE IN and CUE OUT markers). In such embodiments, the video packaging and origination service 120 can bypass or ignore the manually inserted markers in favor of any dynamically determined insertion points. In other embodiments, the video packaging and origination service 120 can supplement at least a portion of the manually determined markers with one or more the dynamically determined insertion. For example, the video packaging and origination service 120 can utilize thresholds or time windows that establish a minimum amount of time that has to be between markers (manual or dynamic) and then select from markers meeting the time criteria. In still other embodiments, the video packaging and origination service 120 can be configured with priority criteria or sorting criteria that facilitates the selection between manually configured markers and dynamically determined insertion points.

At block 706, the video packaging and origination service 130 can utilize the dynamic determination of insertion points to further process the encoded content segments to select or form the supplemental content to be included in the content stream. For example, the video packaging and origination service can utilize image or object recognition services to identify one or more objects in the rendered encoded content segments and utilize the recognized objects as keywords or primary targets for the supplemental content. In this embodiment, the video packaging and origination service 120 can have templates or learning algorithms that can process rendered screen displays and generate associated objects. For example, the video packaging and origination service 120 can utilize machine learning algorithms that are trained specifically to identify object associated with entities that have contractually signed up for supplemental content. Accordingly, while the rendered content can include a number of objects capable of being detected, the video packaging and origination service 120 can be configured specifically to identify a smaller subject of the detectable objects.

In another example, the video packaging and origination service 120 can utilize textual analysis of third party content, such as social media feeds, to identify topics of interest at the determined insertion points. As described above, keyword searching may be preconfigured by the video packaging and origination service 120 or can be naturally inferred based on frequency or reoccurrence of keywords. In yet another example, the video packaging and origination service 120 can utilize audio feeds to identify keywords or other contextual information in the audio track associated with the determined insertion points. In still a further example, the video packaging and origination service can utilize profile information, such as user or group preferences, to select between applicable supplemental content (e.g., a user profile specifying a preference for a brand of soda in situations in context of the streaming content indicate an opportunity to promote drinks).

In addition to the utilization of the content segments or social media inputs, the video packaging and origination service 120 can utilize information associated with individuals or groups of individuals to select, or select from, supplemental content. For example, if the video packaging and origination service 120 determines that a screen includes an image of a glass, the video packaging and origination service 120 can utilize preferences for brands of drinks to dynamically select supplemental content advertising preferred drinks. Such preferences may be based on individual user preferences or group preferences (e.g., users in the Northeast). In another example, the video packaging and origination service 120 can utilize profile information to determine not to select particular content, such as content identified as offensive, content previously presented or preference information indicating a preference to avoid particular content.

In some embodiments, the video packaging and origination service 120 can utilize a service to provide the content based on keywords obtained utilized the techniques identified above. Additionally, the video packaging and origination service 120 can invoke on-demand code or tasks that enables the video packaging and origination service 120 to insert selected supplemental content into the manifest, such as at a media endpoint.

At block 708, the video packaging and origination service 120 generates a content manifest that identifies a listing of available encoding bitrates or bitrate/format combinations for a first segment of the requested content. Illustratively, the listing of available encoding bitrates or bitrate/format combinations includes sufficient information that allows the user computing device 102 to process the information and request individual encoded content segments from the content stream. The encoded content segments can be identified sequentially in a manner that determines, at least in part, an order of request and rendering on the user device 102. Additionally, in some embodiments, the manifest can identify multiple portions, such as a first portion corresponding to the requested content (e.g., a movie or live event) and a second portion corresponding to additional or supplemental content. Illustratively, the additional or supplemental content can be advertisements or additional content that is to be rendered along with the requested content. In embodiments in which the content streams include multiple portions, as identified above, each portion may be sequenced differently. Alternatively, in some embodiments, the requested content segments may share common sequencing data. The content manifests can further include additional meta-data, such as hyperlinks, display configurations, or other information utilized by the user device 102. The advertisement content can be identified by markers provided by the video packaging and origination service 120. At block 710, the video packaging and origination service 120 transmits the content manifest to the user device 102.

At block 712, the routine 700 terminates.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to transmit content comprising:
   one or more computing devices associated with a video packaging and origination service, wherein the video packaging and origination service is configured to:
   encode received content into a set of encoded content segments;
   store the set of encoded content segments in a data store;
   receive content requests from one or more computing devices;
   process the set of encoded content segments by;
   determining video and audio attributes of sequential segments in a series of encoded content segments of the set of encoded content segments; and
   characterizing one or more segments of the sequential segments as indicative of a scene change or transition based on differences between the determined video and audio attributes of the sequential segments;
   dynamically determine one or more new insertion points in the set of encoded content segments during the processing of the set of encoded content segments based on the characterized one or more segments;
   select between manually configured markers and the dynamically determined new insertion points based on priority criteria to form a set of insertion points; and
   select at least one new content based on at least one of social media information and the determined video and audio attributes.

2. The system of claim 1, wherein the video packaging and origination service is further operable to select the at least one new content based on profile information.

3. The system of claim 1, wherein the determined video attribute corresponds to a determination of an identifiable object.

4. The system of claim 1, wherein the determined audio attribute corresponds to a determination of an identifiable object.

5. The system of claim 1, wherein the social media information corresponds to an expression of a threshold amount of keywords.

6. A computer-implemented method to manage delivery of encoded content segments comprising:
   receiving content requests from one or more computing devices;
   processing streaming content responsive to the content requests to dynamically determine one or more new insertion points as the streaming content is being processed by:
   determining video and audio attributes of sequential segments in a series of encoded content segments;
   characterizing one or more segments of the sequential segments as indicative of a scene change or transition based on differences between the determined video and audio attributes of the sequential segments; and
   determining the one or more new insertion points in the set of encoded content segments based on the characterized one or more segments;
   selecting, based on priority criteria, between manually configured markers and the dynamically determined new insertion points to form a set of insertion points; and
   selecting one or more new content based on the set of insertion points.

7. The computer-implemented method of claim 6 further comprising storing, in a data store, a plurality of encoded segment requests corresponding to the streaming content.

8. The computer-implemented method of claim 6, wherein processing streaming content to dynamically determine one or more new insertion points includes dynamically determining a frequency of insertion points.

9. The computer-implemented method of claim 6, wherein processing streaming content to dynamically determine one or more new insertion points includes processing the streaming content utilizing at least one video attribute, audio attribute or social media input.

10. The computer-implemented method of claim 9, wherein processing the streaming content utilizing the at least one video attribute includes processing to identify identifiable objects from a set of identifiable objects.

11. The computer-implemented method of claim 9, wherein processing the streaming content utilizing the at least one audio attribute includes processing to identify identifiable objects from a set of identifiable objects.

12. The computer-implemented method of claim 9, wherein processing the streaming content utilizing the at least one social media input includes identifying a threshold volume of keywords.

13. The computer-implemented method of claim 6, wherein selecting the one or more new content based on the set of insertion points includes selecting the one or more new content utilizing profile information.

14. The computer-implemented method of claim 13, wherein selecting the one or more new content utilizing profile information includes selecting or omitting the one or more new content utilizing preference information from the profile information.

15. A computer-implemented method to manage delivery of encoded content segments comprising:
   receiving content requests from one or more computing devices;
   determining, by processing streaming content corresponding to the content requests, video and audio attributes of sequential encoded content segments;
   characterizing one or more segments of the sequential encoded content segments as associated with a scene change or transition based on differences between the video and audio attributes of the sequential encoded content segments;
   selecting, based on priority criteria, between manually configured markers and a set of dynamically determined new insertion points to form a set of insertion points, wherein the dynamically determined new insertion points are based on the characterized one or more segments and wherein the dynamically determined new insertion points are determined as the streaming content is being processed; and
   selecting one or more new content based on the set of insertion points.

16. The computer-implemented method of claim 15, wherein selecting the one or more new content includes utilizing the at least one video attribute or audio attribute.

17. The computer-implemented method of claim 16, wherein selecting the one or more new content utilizing the at least one audio attribute includes determining a language preference from the at least one audio attribute.

18. The computer-implemented method of claim 15, wherein selecting the one or more new content includes utilizing at least one social media input.

19. The computer-implemented method of claim 15, wherein selecting the one or more new content includes utilizing profile information.

* * * * *